United States Patent [19]

Reusche et al.

[11] Patent Number: 5,140,134
[45] Date of Patent: Aug. 18, 1992

[54] NESTABLE STACKABLE HEATED BOWL WITH THERMOSTATICALLY CONTROLLED ELECTRIC HEATING ELEMENT

[75] Inventors: Thomas K. Reusche, Wayne; Donald W. Reusche, St. Charles; Donald B. Owen, Villa Park, all of Ill.

[73] Assignee: Allied Precision Industries, Inc., Geneva, Ill.

[21] Appl. No.: 565,469

[22] Filed: Aug. 10, 1990

[51] Int. Cl.[5] .................... H05B 1/02; H05B 3/00; A01K 5/01; A47J 31/00
[52] U.S. Cl. .................... 219/441; 219/436; 219/438; 392/444; 119/73
[58] Field of Search .............. 219/430–442; 392/441, 442, 444

[56] References Cited

U.S. PATENT DOCUMENTS

| | | | |
|---|---|---|---|
| 2,035,147 | 3/1936 | Dennis | 219/436 X |
| 2,536,596 | 1/1951 | Fisher | 219/436 |
| 3,585,362 | 6/1971 | Heegesteger et al. | 219/439 |
| 3,606,697 | 9/1971 | Eden | 219/442 X |
| 3,622,036 | 11/1971 | Bongaerts | 119/61 X |
| 3,722,476 | 3/1973 | Van Ness et al. | 119/61 |
| 4,063,068 | 12/1977 | Johnson et al. | 219/436 X |
| 4,138,606 | 2/1979 | Brown | 219/436 X |
| 4,439,668 | 3/1984 | Wells | 219/438 |
| 4,561,384 | 12/1985 | Liff | 119/73 |
| 4,967,061 | 10/1990 | Weber et al. | 219/438 |

*Primary Examiner*—Anthony Bartis
*Attorney, Agent, or Firm*—Allegretti & Witcoff, Ltd.

[57] ABSTRACT

A nestable heated bowl comprises an outer wall, an inner wall and a bottom wall integrally connected to one another, for example, by molding plastic. The inner wall defines a cavity for receiving material such as water or food. The bottom edge of the outer wall defines an open lower end of the bowl. The bottom wall is spaced upwardly from the plane of the bottom edge of the outer wall. The inner wall and outer wall taper upwardly to define a space and are joined together to define a bowl edge. The inner wall, outer wall, and bowl edge of a second bowl are adapted to be received in said space in a compact, interengaging stackable fashion. An electric heating element, thermostat and cord are carried on underside of the bottom wall. When the bowl is inverted, the cord is windable around the thermostat adjacent to the heating element so as not to interfere with the interengaging nesting of a second bowl with the first bowl during shipment.

8 Claims, 4 Drawing Sheets

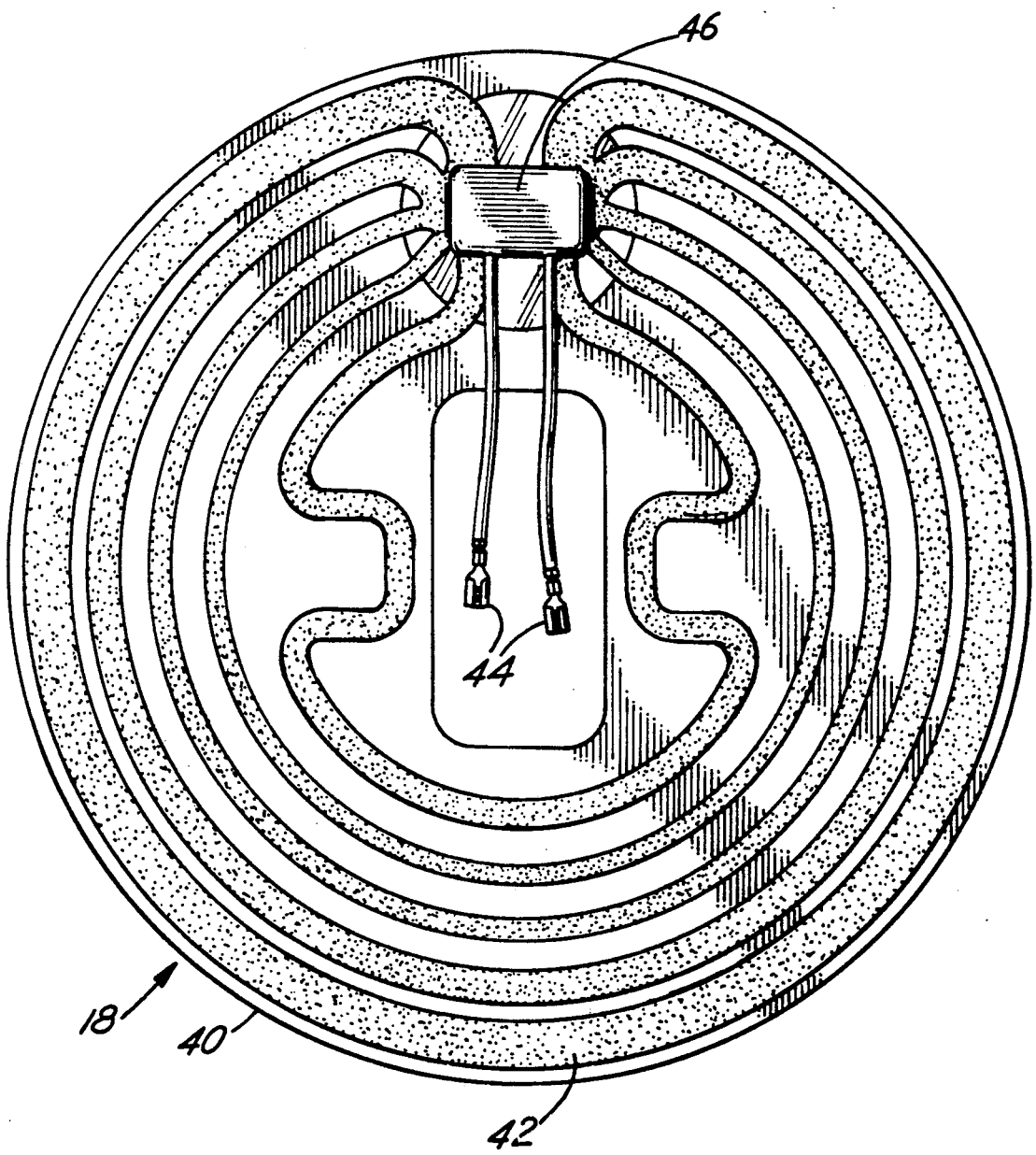

NESTABLE STACKABLE HEATED BOWL WITH THERMOSTATICALLY CONTROLLED ELECTRIC HEATING ELEMENT

BACKGROUND OF THE INVENTION

The present invention relates generally to a heated bowl designed to prevent liquids such as water from freezing when it is placed outside in cold, below freezing weather, and more particularly to a heated pet bowl that permits the bowls to be stacked and nested upon one another in a stable fashion to permit the bowls to be placed on public display and/or to be stacked in a small amount of space in the home or in the store.

Heated bowls, particularly bowls designed to keep water from freezing in below freezing temperature so that a pet will have access to water or food at all times were known prior to the present invention. The prior art pet bowls, however, all had a common undesirable feature; that is, all of the prior art pet bowls known to the inventors were not nestable in an interengaging compact fashion. In particular, the prior art heated pet bowls are manufactured by placing a heating element in the bottom of the bowl and enclosing the entire bottom of the pet bowl. By enclosing the entire bottom of the bowl there is produced a structure that does not permit the bowls to be conveniently nested or for the power cord to be conveniently stored in the bottom portion of the bowl.

OBJECTS OF THE INVENTION

The present invention has been devised in such a way as to avoid the above-mentioned undesirable features of inability to nest interengagingly and inability to store the power cord. To this end, the improved device encloses a heating element in a thin cavity beneath the bowl. Rather than totally enclosing the entire area under the bowl, the improved device leaves open the space beneath the thin cavity and behind and underneath the sides of the bowl. In the center portion of this open space, the power cord of the device may be neatly coiled adjacent to the heating element cavity and around a centrally positioned thermostat mechanism for storage during shipment. In the circumferential portion of this open space, a second bowl will fit neatly, thus allowing for the nestable stacking of a plurality of such bowls.

Therefore, it is an object of the present invention to provide a heated bowl wherein a plurality of bowls can be nested one upon another in a manner that minimizes storage space.

Another object of the present invention is to provide a heated bowl which provides space for storing the cord used to provide electric power to the bowl in a space beneath the bottom of the heated inverted bowl, while still permitting the heated bowls to be nested one upon another in a manner that minimizes storage space during.

Yet another object of the present invention is to provide an improved nestable heated bowl for pet food or the like which interengages with another like bowl to provide a stable and compact stack. Other objects and advantages of the present invention will be made more apparent hereinafter.

BRIEF DESCRIPTION OF THE DRAWINGS

There is shown in the attached drawing a presently preferred embodiment of the present invention, wherein like numerals in the various views refer to like elements, and wherein.

DETAILED DESCRIPTION OF THE INVENTION

Figure 1:
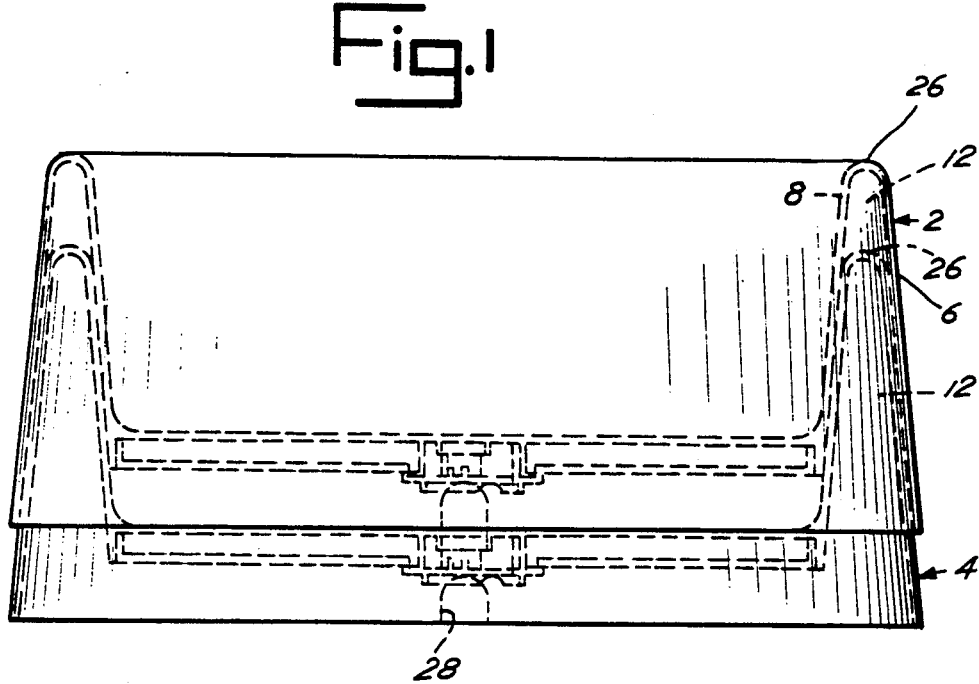
FIG. 1 is a side elevational view showing two superimposed heated bowls in accordance of the present invention to show the ability of these bowls to be nested one upon another.

Referring to FIG. 1, there is illustrated two nestable heated bowls 2 and 4 showing the storage of bowl 2 over bowl 4. Bowl 2, which is identical to bowl 4, is illustrated in greater detail in FIG. 2. Bowl 2 is formed from a molded plastic by means well known to those trained in the art. The molded bowl 2 is provided with an outer wall 6, an inner wall 8 and an interior bottom 10. Preferably, the bowl 2 is circular, as shown, for ease of cleaning, though other shapes, such as square, are possible, as will be apparent to persons trained in the art. Inner wall 8 and bottom 10 cooperate to define a hollow cavity 14 for containing liquid, or food, within the bowl structure 2. As illustrated, outer wall 6 and inner wall 8 taper upwardly and are spaced apart a distance sufficient to define a space 12 between outer wall 6 and inner wall 8. Walls 6 and 8 meet at the top to provide a curved or rounded bowl edge 26. The bottom edge 32 of outer wall 6 defines an open lower end of the bowl. The bowl edge 26 of lower dish 4 extends substantially upwards within space 12 of upper dish 2 (See FIG. 1). As a result, approximately 12 bowls can be stacked upon one another and take up the same amount of space as four bowls of the prior art. In addition, the bowls of the present invention are substantially more stable when stacked upon each other than the prior art bowls because of the insertion of edge 26 of one bowl into the space 12 of a second bowl. In the prior art, the bottom of the bowl is enclosed at bottom edge 32. As a result, the bowls cannot be stacked in an interengaging manner, as with the present invention, and there is no room to store an electrical cord within the base of the bowl.

Figure 2:
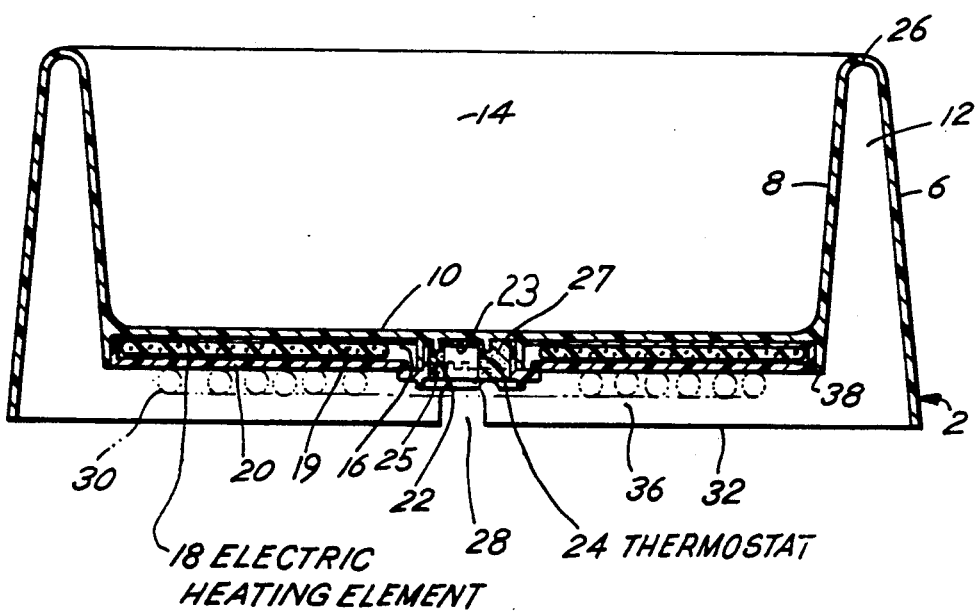
FIG. 2 is a side sectional view of one of the nestable heated bowls shown in FIG. 1.

Referring to FIG. 2, stackable heated bowl 2 is provided with a heating element cavity 16 between the bottom 10 of hollow cavity 14 and bottom base 20. Specifically, bottom 10 and base 20 cooperate to provide a hollow cavity 16. A conventional flat resistive ink heating element 18 as illustrated in FIG. 5 is placed in this cavity 16 in heat transfer relationship with the bottom 10. Normally the heating element 18 is bonded by an adhesive or otherwise affixed to the bottom 10.

Foam insert 19 provides insulation for cavity 16 and helps the transfer of heat from heating element 18 to the bottom 10 of the bowl. Heating element 18 provides uniform heating with almost full contact between the flat bottom 10 of the bowl and the flat top surface of heater element 18. This arrangement maximizes heat transfer to bottom 10 of the bowl. Element 18 is preferably a thin resistive ink element of the type manufactured by Flexwatt Corporation, 2380 Cranberry Highway, West Wareham, Mass. 02756. As illustrated in FIG. 5, heating element 18 is a thin flexible sheet 40 having a resistive ink heating elements 42 printed thereon. Electricity is provided to heating elements 42 through electrical leads 44 and junction 46. Leads 44 in turn are connected to thermostat 24.

Positioned in the center of the bowl is a cavity wall 25 defining a thermostat cavity 22 adapted to receive a conventional thermostat 24. Between the thermostat 24 and the bottom 10 of the bowl is a thermal enhancing compound 23 such as a heat sink compound or a thermally conductive pad for increasing thermal conductivity between the bottom of the bowl and the thermostat 24. The temperature of the contents of the liquids or solids placed within cavity 14 is monitored by thermostat 24 which, in turn, controls the amount of electricity to and thus the amount of heat transmitted by heating elements 18 to the contents of cavity 14. The bottom edge 32 of stackable heated bowl 2 is spaced outwardly from the bottom base 20 of heating element cavity 16 to permit the accommodation of a conventional electric cord.

Figure 3:
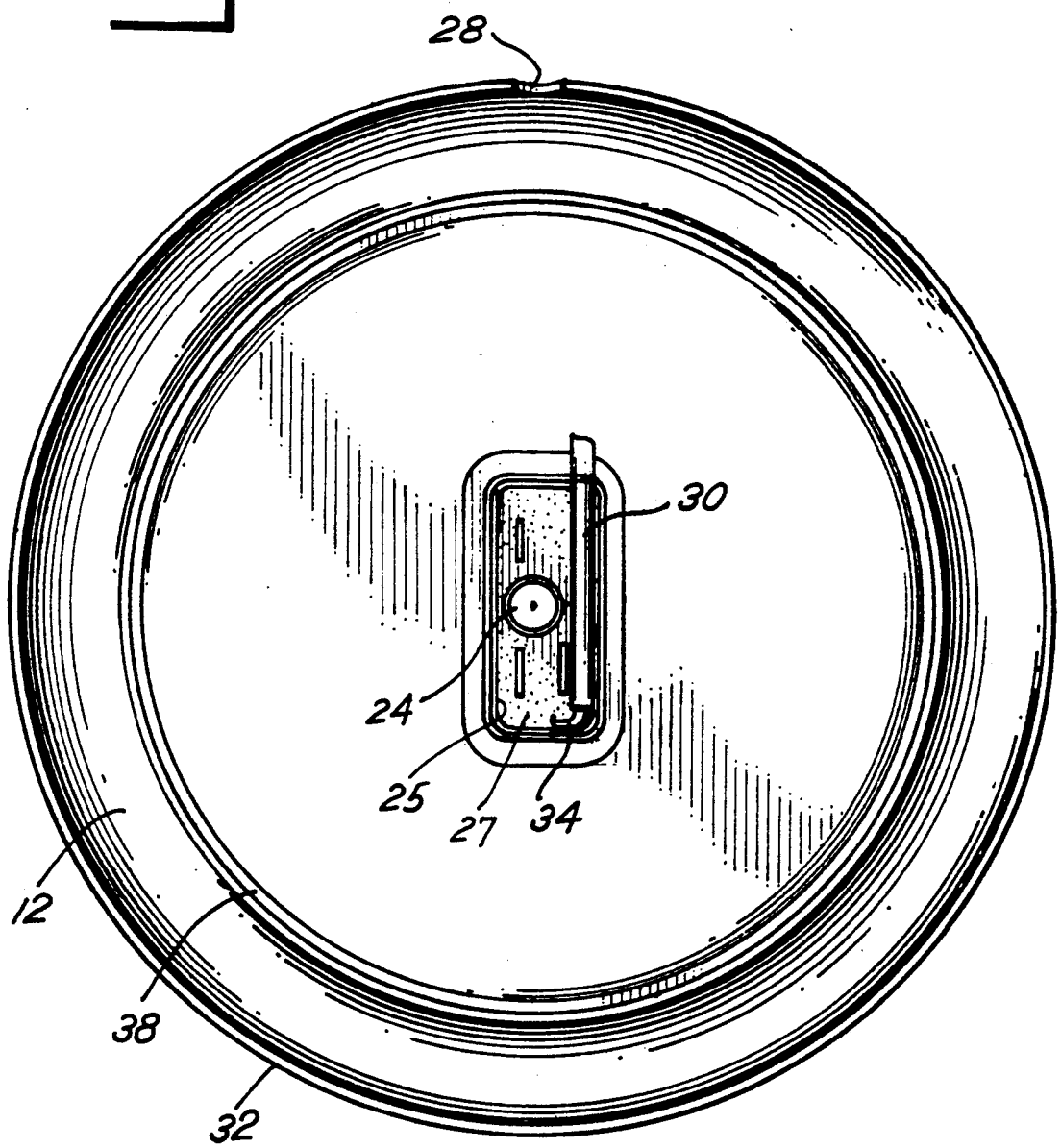
FIG. 3 is a bottom view of the bowls illustrated in FIGS. 1 and 2 eliminating an illustration of the cord used to provide electricity to the heating element.
Figure 4:
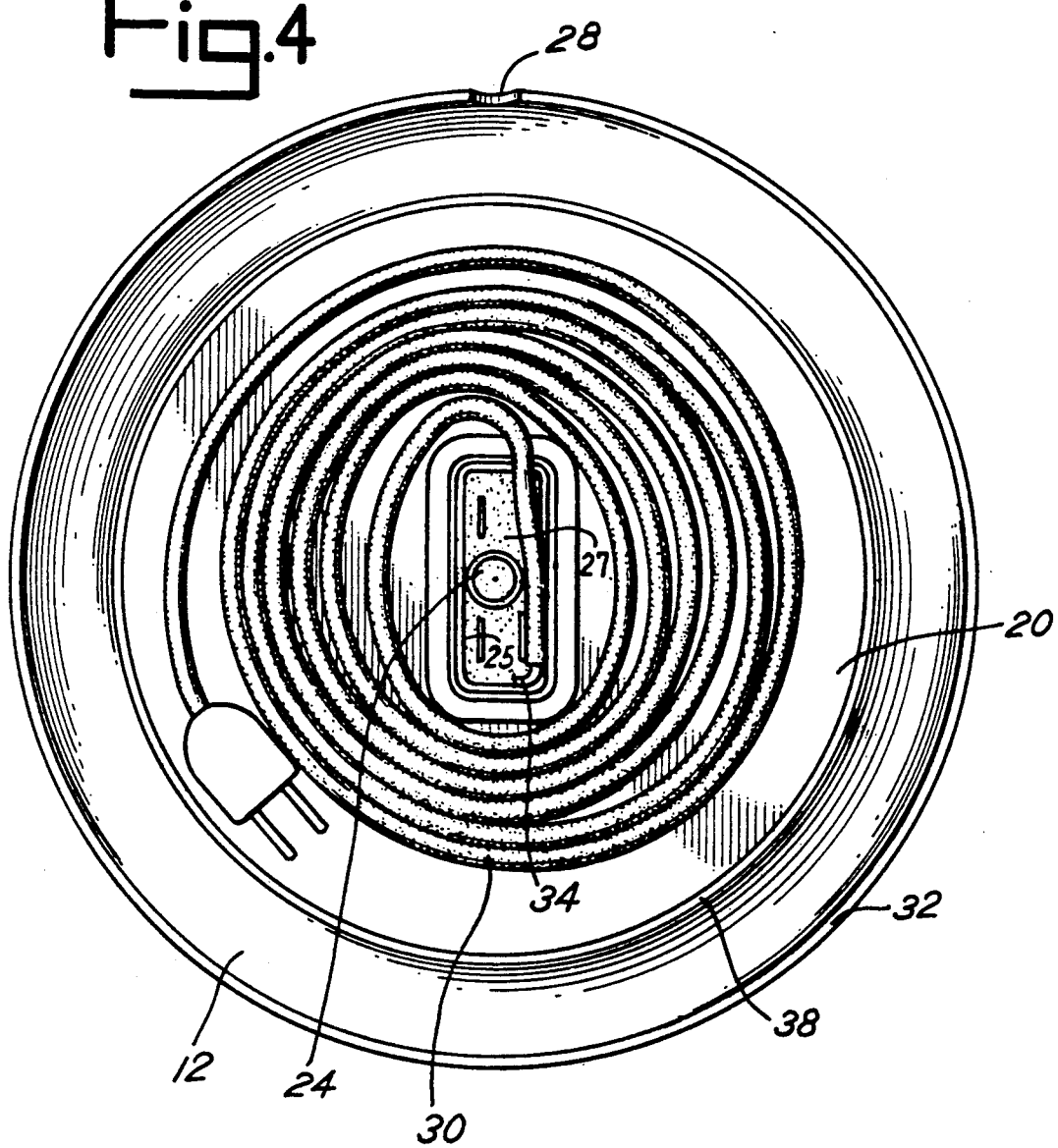
FIG. 4 is a bottom view of one of the nestable heated bowls illustrated in FIG. 1, showing the positioning of an electric power cord on the bottom portion of the heated bowl to permit the bowl to be nested while still providing a space for storage of the electric cord; and, FIG. 5 is a plan view of a preferred heating element used in the bowls.

Referring to FIGS. 3 and 4, a conventional electric cord 30 is connected to thermostat 24 in thermostat cavity 22. The flexible electric cord 30 extends from the cavity 22 and is then looped around thermostat cavity 22 and placed on top of bottom base 20 when the bowl is inverted. The cord 30 then occupies the space 36 between the bottom edge 32 of the bowl and bottom base 20. The cord 30 is wound or looped so as to lie in a generally horizontal plane. The cord 30 should not extend beyond the perimeter or edge 38 of bottom base 20. If the cord extends beyond edge 38 it could interfere with the placement of top bowl edge 26 into the space 12 between walls 6 and 8 and thus interfere with the compact interengaging nesting of the bowls. In order to facilitate the planar disposition of the cord 30 during storage, the cord 30 is placed against a wall of the thermostat cavity 22, as best seen in FIG. 4. The cord 30 slopes upwardly and outwardly from the bottom of the cavity 22. The leads 34 from cord 30 are secured to thermostat 24 and to the heating element 18 in a conventional fashion. Preferably, the cavity 22 is filled with an epoxy or other potting compound 27 to secure the leads 34 from the end of the cord 30 in place and to protect against moisture.

When the stackable heated bowl 2 is used, the flexible electrical cord 30 is uncoiled from the bottom wall of the inverted bowl and placed through notch or opening 28 in outer wall 6. This permits the stackable heated bowl 2 to be placed right side up on a flat surface during use.

While we have shown a presently referenced embodiment of the present invention, it is understood that the invention may be otherwise embodied within the scope of the following claims.

We claim:

1. A nestable heatable bowl comprising an outer wall, an inner wall and a bottom wall connected to one another, the inner wall and bottom wall defining an open top cavity for holding material, the bottom wall being spaced upwardly from the plane of the bottom edge of the outer wall, said bottom edge of the outer wall defining an open bottom of the bowl, the inner wall and outer wall tapering toward a joinder defining an upper bowl edge and said inner and outer walls cooperating to define an open annular space communicating with said open bottom which is adapted to receive the upper bowl edge, inner wall and outer wall of a second like bowl in an interengaging stacked nested relationship; and, a heating element mounted on and in a heat transfer relationship with the underside of the bottom wall of the open top cavity.

2. A nestable bowl as in claim 1 further including a cord secured to the heating element, said cord capable of being stored between the bottom wall and the bottom edge of the outer wall of the inverted bowl when not in use and a passage through the outer wall whereby the cord can be extended outwardly of the space between the bottom wall and the bottom edge of the outer wall and connected to a power source.

3. A nestable bowl as in claim 2 including a thermostat for controlling operation of the heating element secured centrally to the bottom wall, the cord being capable of being looped around the thermostate within the perimeter of said bottom wall for compactness so as not to interfere with the stacking of a second bowl.

4. A nestable bowl as in claim 2 including a base spaced downwardly from the bottom wall to define a second cavity, said base being laterally co-terminus with the perimeter of said bottom wall so as to not obstruct the space between the inner and outer bowl walls, and said base being spaced upwardly from the plane of the bottom edge of the outer wall, said heating element being received and retained in said second cavity.

5. A nestable bowl as in claim 4 including a thermostat for controlling operation of the heating element, wall means defining a thermostat cavity positioned in the center of the base, said thermostat being disposed in said thermostat cavity, said cord being looped around the wall means defining the thermostat cavity for compactness and confined within the perimeter of said base so as not to interfere with stacking of another bowl and, an opening in the wall to permit the cord to pass through the wall and to permit flat placement of the bowl on a surface.

6. A nestable bowl as in claim 1 wherein the bowl is molded from plastic.

7. A nestable bowl as in claim 1 wherein the heating element is a flexible, resistive ink heating element.

8. A nestable bowl as in claim 7 wherein the heating element is secured to the bottom wall.

* * * * *